2 Sheets—Sheet 2.
G. GARDNER & J. HILL.
TWINE-HOLDER.
No. 179,009. Patented June 20, 1876.
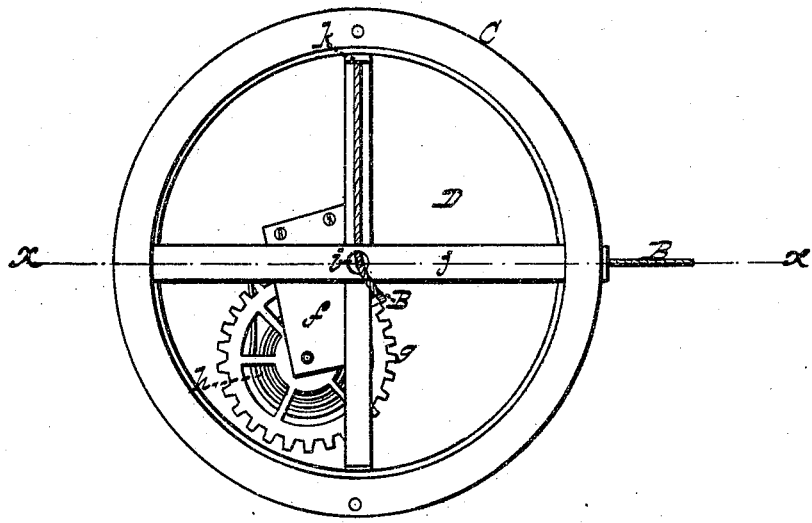
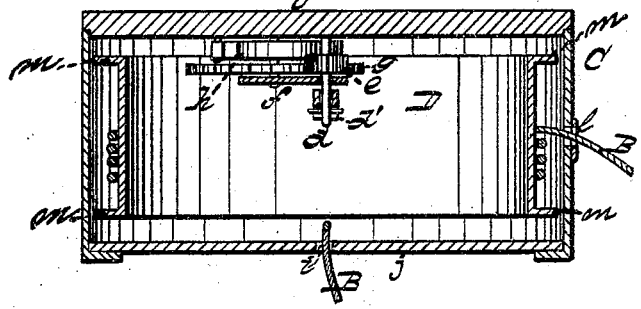
WITNESSES
INVENTOR
ATTORNEYS

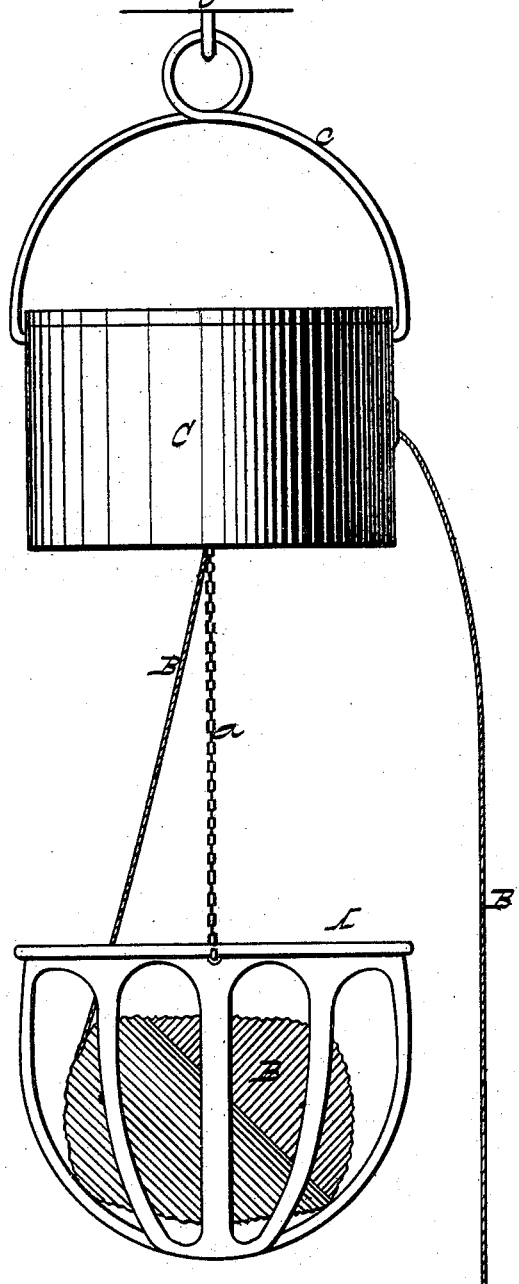

UNITED STATES PATENT OFFICE.

GEORGE GARDNER, OF BROOKLYN, NEW YORK, AND JONATHAN HILL, OF GLEN GARDNER, NEW JERSEY; SAID HILL ASSIGNOR TO SAID GARDNER.

IMPROVEMENT IN TWINE-HOLDERS.

Specification forming part of Letters Patent No. 179,009, dated June 20, 1876; application filed April 15, 1876.

*To all whom it may concern:*

Be it known that we, GEORGE GARDNER, of Brooklyn, in the county of Kings and State of New York, and JONATHAN HILL, of Glen Gardner, county of Hunterdon and State of New Jersey, have invented certain new and useful Improvements in Twine-Holder Attachments; and we do hereby declare that the following is a full, clear, and exact description thereof, which will enable others skilled in the art to which it appertains to make and use the same, reference being had to the accompanying drawings, and to letters of reference marked thereon, which form a part of this specification, and in which—

Figure 1, Sheet 1, is a side elevation of our improved surplus-twine attachment for twine-holders. Fig. 2, Sheet 2, is an inverted view of the said attachment, and Fig. 3 a vertical section through the dotted line $x$ $x$ of Fig. 2.

Corresponding parts in the several figures are designated by like letters.

This invention relates to a certain improvement in twine-holder attachments for taking up the loose or slack twine; and it consists of a cylinder having an aperture or orifice, and hung in a second cylinder having an aperture or orifice and perforated guiding-bar, in combination with a spring, and the cord or twine passing through the apertures or orifices in the said cylinders and bar, and around the inner cylinder, substantially as hereinafter set forth.

In the annexed drawing, A refers to an ordinary twine-holder, as indicated by its name, for holding the ball of twine or cord B, and suspended, by a chain, $a$, or other suitable means, from the cylinder C, which, in turn, is suspended by a bail, $c$, or otherwise, from the ceiling. Arranged in the cylinder C is a second cylinder, D, having an axis, $d$, the lower end of which bears in and is keyed to a bar, $d'$, of the cylinder D, and its upper end in the head of cylinder C. Upon the axis $d$ is a pinion, $e$, interposed between which and a hub or collar upon the bar $d'$ is a plate, $f$, fastened by its angular portions to the head of the cylinder and forming a bearing for the lower end of an axis depending from the head of the cylinder C, and provided with a toothed wheel, $g$, gearing with the pinion $e$ and driven by a spring, $h$, or its equivalent, rotating the cylinder D.

The above-described attachment is put in operation by passing the cord B through the orifice $i$ of the bar $j$ of cylinder C, thence through an orifice at $k$ in, and several times around the circumference of, the cylinder D, after which it is conducted through an orifice, $l$, in the circumference of the cylinder C, and allowed to depend therefrom within convenient reach of the attendant at the counter. As the cord is drawn out sufficiently to uncoil that around the cylinder D, the orifice in the latter cylinder is in a line with the orifice in the cylinder C, and the spring of the cylinder D coiled more closely, when the cord passes through the two apertures or orifices in a direct line, to be further drawn out in wrapping up the package or packages. Immediately upon the release of the cord the spring uncoils and imparts a sufficient number of revolutions to the cylinder D, to wind thereon the loose or surplus twine, to elevate it out of the way or remove it from off the counter. $m$ $m$ are flanges upon the circumference of the cylinder D, to prevent the cord slipping therefrom.

We claim—

The cylinder D, having an orifice or aperture, $k$, in combination with the cylinder C, having an orifice, $l$, and perforated guide-bar $i j$, a spring, $h$, and cord B, the latter passing through the orifices of the cylinder and bar, and around the cylinder D, substantially as and for the purpose set forth.

In testimony that we claim the foregoing as our own we hereunto affix our signatures in presence of two witnesses.

GEO. GARDNER.
JONATHAN HILL.

Witnesses:
JOHN M. GARDNER,
E. J. BELL.